(12) United States Patent
Sinha et al.

(10) Patent No.: US 9,282,346 B2
(45) Date of Patent: Mar. 8, 2016

(54) METHOD AND SYSTEM FOR AUTOMATIC CONTENT RECOGNITION (ACR) INTEGRATION FOR SMARTTVS AND MOBILE COMMUNICATION DEVICES

(71) Applicant: Turner Broadcasting System, Inc., Atlanta, GA (US)

(72) Inventors: Nishith Kumar Sinha, Mableton, GA (US); Matthew Paul Giles, Marietta, GA (US); Donald Jude Loheide, Mableton, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 14/141,931

(22) Filed: Dec. 27, 2013

(65) Prior Publication Data

US 2014/0282657 A1 Sep. 18, 2014

Related U.S. Application Data

(60) Provisional application No. 61/798,439, filed on Mar. 15, 2013.

(51) Int. Cl.
*H04N 21/234* (2011.01)
*H04N 21/23* (2011.01)
(Continued)

(52) U.S. Cl.
CPC .............. *H04N 21/23* (2013.01); *H04H 20/93* (2013.01); *H04H 60/37* (2013.01); *H04H 60/40* (2013.01); *H04H 60/82* (2013.01); *H04N 21/234* (2013.01); *H04N 21/23418* (2013.01); *H04N 21/23424* (2013.01); *H04N 21/2407* (2013.01); *H04N 21/4122* (2013.01); *H04N 21/4126* (2013.01);
(Continued)

(58) Field of Classification Search
CPC ............ H04N 21/431; H04N 21/4316; H04N 21/234; H04N 21/23418
See application file for complete search history.

(56) References Cited

U.S. PATENT DOCUMENTS 5,305,464 A 4/1994 Frett
5,410,326 A 4/1995 Goldstein
(Continued)

FOREIGN PATENT DOCUMENTS

WO    WO 95/17746 A1   6/1995
WO    WO 02/37316 A2   5/2002
WO    WO 03/067459 A1  8/2003

*Primary Examiner* — Robert Hance
(74) *Attorney, Agent, or Firm* — Loza & Loza, LLP; Hopeton Walker

(57) ABSTRACT

A second screen communication device that is paired with an automatic content recognition (ACR) enabled display communication device launches an interactive application in response to an invitation cue generated and presented by the ACR-enabled display communication device while the ACR-enabled display communication device is displaying linear broadcast content. The linear broadcast content is a non-IP based broadcast content. The interactive application launched on the second screen communication device enables interaction with interactive content displayed by a user interface on the second screen communication device based on the invitation cue. The second screen communication device may generate one or more control elements that are utilized to control the interaction with the interactive content. The displaying of IP-based digital stream content corresponding to the linear broadcast content on the automatic content recognition enabled display may be resumed on the ACR enabled communication device utilizing the generated one or more control elements.

31 Claims, 6 Drawing Sheets

(51) Int. Cl.

| | | |
|---|---|---|
| *H04H 60/40* | (2008.01) | |
| *H04N 21/44* | (2011.01) | |
| *H04N 21/61* | (2011.01) | |
| *H04N 21/84* | (2011.01) | |
| *H04N 21/414* | (2011.01) | |
| *H04N 21/41* | (2011.01) | |
| *H04N 21/431* | (2011.01) | |
| *H04N 21/643* | (2011.01) | |
| *H04H 60/37* | (2008.01) | |
| *H04H 20/93* | (2008.01) | |
| *H04H 60/82* | (2008.01) | |
| *H04N 21/432* | (2011.01) | |
| *H04N 21/472* | (2011.01) | |
| *H04N 21/81* | (2011.01) | |
| *H04N 21/858* | (2011.01) | |
| *H04N 21/24* | (2011.01) | |
| *H04N 21/435* | (2011.01) | |
| *H04N 21/442* | (2011.01) | |

(52) U.S. Cl.
CPC ....... *H04N 21/41407* (2013.01); *H04N 21/431* (2013.01); *H04N 21/435* (2013.01); *H04N 21/4316* (2013.01); *H04N 21/4325* (2013.01); *H04N 21/442* (2013.01); *H04N 21/44008* (2013.01); *H04N 21/472* (2013.01); *H04N 21/47205* (2013.01); *H04N 21/6125* (2013.01); *H04N 21/6175* (2013.01); *H04N 21/64322* (2013.01); *H04N 21/812* (2013.01); *H04N 21/8173* (2013.01); *H04N 21/84* (2013.01); *H04N 21/858* (2013.01)

(56) References Cited

U.S. PATENT DOCUMENTS

| | | | |
|---|---|---|---|
| 5,437,050 A | 7/1995 | Lamb et al. | |
| 5,712,995 A | 1/1998 | Cohn | |
| 5,874,686 A | 2/1999 | Ghias et al. | |
| 5,918,223 A | 6/1999 | Blum et al. | |
| 5,956,683 A | 9/1999 | Jacobs et al. | |
| 5,991,737 A | 11/1999 | Chen | |
| 6,121,530 A | 9/2000 | Sonoda | |
| 6,184,877 B1 | 2/2001 | Dodson et al. | |
| 6,201,176 B1 | 3/2001 | Yourlo | |
| 6,314,577 B1 | 11/2001 | Pocock | |
| 6,408,272 B1 | 6/2002 | White et al. | |
| 6,504,089 B1 | 1/2003 | Negishi et al. | |
| 6,556,218 B1 | 4/2003 | Alcorn | |
| 6,760,720 B1 | 7/2004 | De Bellis | |
| 6,765,595 B2 | 7/2004 | Lee et al. | |
| 6,834,308 B1 | 12/2004 | Ikezoye et al. | |
| 6,968,337 B2 | 11/2005 | Wold | |
| 6,990,453 B2 | 1/2006 | Wang et al. | |
| 7,080,325 B2 | 7/2006 | Treibach-Heck et al. | |
| 7,095,871 B2 | 8/2006 | Jones et al. | |
| 7,134,132 B1 | 11/2006 | Ngo et al. | |
| 7,174,293 B2 | 2/2007 | Kenyon et al. | |
| 7,190,971 B1 | 3/2007 | Kawamoto | |
| 7,194,752 B1 | 3/2007 | Kenyon et al. | |
| 7,266,343 B1 | 9/2007 | Yli-juuti et al. | |
| 7,363,278 B2 | 4/2008 | Schmelzer et al. | |
| 7,444,353 B1 | 10/2008 | Chen et al. | |
| 7,500,007 B2 | 3/2009 | Ikezoye et al. | |
| 7,529,659 B2 | 5/2009 | Wold | |
| 7,562,012 B1 | 7/2009 | Wold et al. | |
| 7,562,392 B1 | 7/2009 | Rhoads et al. | |
| 7,565,327 B2 | 7/2009 | Schmelzer | |
| 7,624,416 B1 | 11/2009 | Vandermolen et al. | |
| 7,703,114 B2 | 4/2010 | Thukral | |
| 7,707,088 B2 | 4/2010 | Schmelzer | |
| 7,711,652 B2 | 5/2010 | Schmelzer | |
| 7,730,509 B2 | 6/2010 | Boulet et al. | |
| 7,747,749 B1 | 6/2010 | Erikson et al. | |
| 7,783,489 B2 | 8/2010 | Kenyon et al. | |
| 7,797,249 B2 | 9/2010 | Schmelzer et al. | |
| 7,813,954 B1 | 10/2010 | Price et al. | |
| 7,870,574 B2 | 1/2011 | Kenyon et al. | |
| 7,877,290 B1 | 1/2011 | Arsenault et al. | |
| 7,877,438 B2 | 1/2011 | Schrempp et al. | |
| 7,900,228 B2 | 3/2011 | Stark et al. | |
| 7,917,645 B2 | 3/2011 | Ikezoye et al. | |
| 8,006,274 B2 | 8/2011 | Scott, III | |
| 8,046,803 B1 | 10/2011 | Lee | |
| 8,117,635 B2 | 2/2012 | Hendricks et al. | |
| 8,249,422 B2 | 8/2012 | Narahara et al. | |
| 8,281,339 B1 | 10/2012 | Walker et al. | |
| 8,335,833 B1 | 12/2012 | Parkinson | |
| 8,407,750 B2 | 3/2013 | Vorbau | |
| 8,413,206 B1 | 4/2013 | Wyatt et al. | |
| 8,418,206 B2 | 4/2013 | Bryant et al. | |
| 8,553,148 B2 | 10/2013 | Ramaswamy et al. | |
| 8,572,650 B2 | 10/2013 | Townsend et al. | |
| 8,732,473 B2 | 5/2014 | Bisso et al. | |
| 8,732,739 B2 | 5/2014 | Sillerman | |
| 8,793,274 B2 | 7/2014 | Yu et al. | |
| 2002/0032906 A1 | 3/2002 | Grossman | |
| 2002/0069100 A1 | 6/2002 | Arberman | |
| 2002/0073419 A1 | 6/2002 | Yen et al. | |
| 2002/0078441 A1 | 6/2002 | Drake et al. | |
| 2002/0083060 A1 | 6/2002 | Wang et al. | |
| 2002/0120925 A1 | 8/2002 | Logan | |
| 2002/0133817 A1 | 9/2002 | Markel | |
| 2002/0178447 A1 | 11/2002 | Plotnick et al. | |
| 2003/0002638 A1* | 1/2003 | Kaars | G06F 3/033 379/110.01 |
| 2003/0028796 A1* | 2/2003 | Roberts | G06F 17/30743 713/193 |
| 2003/0035075 A1 | 2/2003 | Butler et al. | |
| 2003/0055699 A1 | 3/2003 | O'Connor | |
| 2003/0056101 A1 | 3/2003 | Epstein | |
| 2003/0101451 A1 | 5/2003 | Bentolila et al. | |
| 2003/0149975 A1 | 8/2003 | Eldering et al. | |
| 2003/0154475 A1 | 8/2003 | Rodriguez et al. | |
| 2003/0172381 A1 | 9/2003 | Janevski | |
| 2004/0003397 A1 | 1/2004 | Boston et al. | |
| 2004/0031046 A1 | 2/2004 | Weinblatt et al. | |
| 2004/0034874 A1 | 2/2004 | Hord et al. | |
| 2004/0068737 A1 | 4/2004 | Itoh et al. | |
| 2004/0143349 A1 | 7/2004 | Roberts et al. | |
| 2004/0143845 A1* | 7/2004 | Lin | H04N 7/17336 725/58 |
| 2004/0189710 A1 | 9/2004 | Goulden et al. | |
| 2004/0205810 A1 | 10/2004 | Matheny et al. | |
| 2004/0210847 A1 | 10/2004 | Berson et al. | |
| 2004/0255322 A1 | 12/2004 | Meadows et al. | |
| 2005/0022211 A1 | 1/2005 | Veselov et al. | |
| 2005/0097599 A1 | 5/2005 | Plotnick et al. | |
| 2005/0149968 A1 | 7/2005 | Konig et al. | |
| 2005/0235307 A1 | 10/2005 | Relan et al. | |
| 2005/0278731 A1 | 12/2005 | Cameron et al. | |
| 2006/0015923 A1 | 1/2006 | Chuah et al. | |
| 2006/0026636 A1 | 2/2006 | Stark et al. | |
| 2006/0031684 A1 | 2/2006 | Sharma et al. | |
| 2006/0187358 A1 | 8/2006 | Lienhart et al. | |
| 2006/0195860 A1 | 8/2006 | Eldering et al. | |
| 2006/0282847 A1 | 12/2006 | Gupte | |
| 2007/0192784 A1 | 8/2007 | Postrel | |
| 2007/0250901 A1 | 10/2007 | McIntire et al. | |
| 2008/0064490 A1 | 3/2008 | Ellis | |
| 2008/0104634 A1 | 5/2008 | Gajdos et al. | |
| 2008/0127253 A1 | 5/2008 | Zhang et al. | |
| 2008/0227436 A1 | 9/2008 | Gantman et al. | |
| 2008/0244640 A1 | 10/2008 | Belleguie | |
| 2008/0250447 A1 | 10/2008 | Rowe et al. | |
| 2008/0305815 A1 | 12/2008 | McDonough | |
| 2008/0310731 A1 | 12/2008 | Stojancic et al. | |
| 2008/0313140 A1 | 12/2008 | Pereira et al. | |
| 2009/0009532 A1 | 1/2009 | Hallberg | |
| 2009/0064261 A1 | 3/2009 | Jung | |
| 2009/0077046 A1 | 3/2009 | Narahara et al. | |
| 2009/0077489 A1 | 3/2009 | Homma | |

(56) References Cited

U.S. PATENT DOCUMENTS

| | | |
|---|---|---|
| 2009/0094637 A1 | 4/2009 | Lemmons |
| 2009/0106104 A1 | 4/2009 | Upendran et al. |
| 2009/0119723 A1 | 5/2009 | Tinsman |
| 2009/0133049 A1 | 5/2009 | Bradley |
| 2009/0150930 A1 | 6/2009 | Sherwin et al. |
| 2009/0235317 A1 | 9/2009 | Igarashi |
| 2009/0259690 A1 | 10/2009 | Bogdanov |
| 2009/0288113 A1 | 11/2009 | Skinner |
| 2009/0317053 A1 | 12/2009 | Morley et al. |
| 2009/0318114 A1 | 12/2009 | Bertoni |
| 2009/0319522 A1 | 12/2009 | Karstens |
| 2009/0327894 A1 | 12/2009 | Rakib et al. |
| 2010/0007797 A1 | 1/2010 | Stojancic |
| 2010/0043040 A1 | 2/2010 | Olsen, Jr. |
| 2010/0095337 A1 | 4/2010 | Dua |
| 2010/0121691 A1 | 5/2010 | Shifflett et al. |
| 2010/0125498 A1 | 5/2010 | Jaramillo |
| 2010/0158391 A1 | 6/2010 | Cunningham et al. |
| 2010/0162344 A1 | 6/2010 | Casagrande et al. |
| 2010/0169906 A1 | 7/2010 | Takahashi |
| 2010/0175078 A1 | 7/2010 | Knudson et al. |
| 2010/0205627 A1 | 8/2010 | Cesmedziev |
| 2010/0205628 A1 | 8/2010 | Davis et al. |
| 2010/0242065 A1 | 9/2010 | Murakami |
| 2010/0245681 A1 | 9/2010 | Harris |
| 2010/0269128 A1 | 10/2010 | Gordon |
| 2010/0303338 A1 | 12/2010 | Stojancic et al. |
| 2010/0306193 A1 | 12/2010 | Pereira et al. |
| 2010/0318515 A1 | 12/2010 | Ramanathan et al. |
| 2010/0325135 A1 | 12/2010 | Chen et al. |
| 2011/0067046 A1 | 3/2011 | Cox et al. |
| 2011/0067066 A1 | 3/2011 | Barton et al. |
| 2011/0078729 A1 | 3/2011 | Lajoie et al. |
| 2011/0078733 A1 | 3/2011 | Lee |
| 2011/0088063 A1 | 4/2011 | Ben-Romdhane et al. |
| 2011/0107363 A1 | 5/2011 | Sanghavi |
| 2011/0122255 A1 | 5/2011 | Haritaoglu |
| 2011/0177775 A1 | 7/2011 | Gupta et al. |
| 2011/0191806 A1 | 8/2011 | Knudson et al. |
| 2011/0219419 A1 | 9/2011 | Reisman |
| 2011/0280434 A1 | 11/2011 | Mamidwar et al. |
| 2011/0283322 A1 | 11/2011 | Hamano |
| 2011/0283327 A1 | 11/2011 | Zhu |
| 2011/0289098 A1 | 11/2011 | Oztaskent et al. |
| 2011/0289114 A1 | 11/2011 | Yu et al. |
| 2011/0289524 A1 | 11/2011 | Toner et al. |
| 2011/0307931 A1 | 12/2011 | Shuster |
| 2011/0311095 A1 | 12/2011 | Archer |
| 2011/0313856 A1 | 12/2011 | Cohen et al. |
| 2011/0314491 A1 | 12/2011 | Delidais et al. |
| 2011/0314495 A1 | 12/2011 | Zenor |
| 2012/0017236 A1 | 1/2012 | Stafford et al. |
| 2012/0042334 A1 | 2/2012 | Choi et al. |
| 2012/0054848 A1 | 3/2012 | Salowey et al. |
| 2012/0079521 A1 | 3/2012 | Garg et al. |
| 2012/0096491 A1 | 4/2012 | Shkedi |
| 2012/0117584 A1 | 5/2012 | Gordon |
| 2012/0124625 A1 | 5/2012 | Foote et al. |
| 2012/0144416 A1* | 6/2012 | Wetzer ............ H04N 21/25816 725/14 |
| 2012/0167133 A1 | 6/2012 | Carroll et al. |
| 2012/0174157 A1 | 7/2012 | Stinson, III et al. |
| 2012/0185895 A1 | 7/2012 | Wong et al. |
| 2012/0192227 A1 | 7/2012 | Fleischman et al. |
| 2012/0215789 A1 | 8/2012 | Ramanathan et al. |
| 2012/0246693 A1 | 9/2012 | Iqbal |
| 2012/0303442 A1 | 11/2012 | Patwa et al. |
| 2012/0311618 A1 | 12/2012 | Blaxland |
| 2012/0317240 A1 | 12/2012 | Wang |
| 2012/0331496 A1 | 12/2012 | Copertino et al. |
| 2013/0014146 A1 | 1/2013 | Bhatia et al. |
| 2013/0019262 A1 | 1/2013 | Bhatia et al. |
| 2013/0047178 A1 | 2/2013 | Moon et al. |
| 2013/0047180 A1 | 2/2013 | Moon et al. |
| 2013/0125163 A1 | 5/2013 | Chen et al. |
| 2013/0132999 A1 | 5/2013 | Pandey |
| 2013/0145414 A1* | 6/2013 | Yamagishi ............ H04N 21/23 725/110 |
| 2013/0162902 A1 | 6/2013 | Musser, Jr. et al. |
| 2013/0163957 A1 | 6/2013 | Ikizyan et al. |
| 2013/0167171 A1 | 6/2013 | Kitazato et al. |
| 2013/0174191 A1 | 7/2013 | Thompson, Jr. et al. |
| 2013/0198768 A1 | 8/2013 | Kitazato |
| 2013/0205315 A1 | 8/2013 | Sinha et al. |
| 2013/0205316 A1 | 8/2013 | Sinha et al. |
| 2013/0205318 A1 | 8/2013 | Sinha et al. |
| 2013/0205319 A1 | 8/2013 | Sinha et al. |
| 2013/0205335 A1 | 8/2013 | Sinha et al. |
| 2013/0208942 A1 | 8/2013 | Davis |
| 2013/0239163 A1 | 9/2013 | Kim et al. |
| 2013/0305335 A1 | 11/2013 | Syed et al. |
| 2013/0332951 A1 | 12/2013 | Gharaat et al. |
| 2013/0339999 A1 | 12/2013 | Sangiovanni et al. |
| 2014/0082659 A1 | 3/2014 | Fife et al. |
| 2014/0089815 A1 | 3/2014 | Gildfind et al. |
| 2014/0150022 A1* | 5/2014 | Oh ...................... H04N 21/478 725/37 |
| 2014/0164994 A1 | 6/2014 | Myslinski |
| 2014/0173661 A1* | 6/2014 | Yamagishi ........... H04N 21/431 725/43 |
| 2014/0282693 A1* | 9/2014 | Soundararajan ..... H04N 21/435 725/32 |

* cited by examiner

METHOD AND SYSTEM FOR AUTOMATIC CONTENT RECOGNITION (ACR) INTEGRATION FOR SMARTTVS AND MOBILE COMMUNICATION DEVICES

CROSS-REFERENCE TO RELATED APPLICATIONS/INCORPORATION BY REFERENCE

This application makes reference to, claims priority to, and claims the benefit of U.S. Application Ser. No. 61/798,439, which was filed on Mar. 15, 2013.

This application also makes reference to:
U.S. application Ser. No. 14/141,972, which was filed on Dec. 27, 2014;
U.S. application Ser. No. 14/141,995, which was filed on Dec. 27, 2014;
U.S. application Ser. No. 14/142,022, which was filed on Dec. 27, 2014;
U.S. application Ser. No. 14/142,041, which was filed on Dec. 27, 2014;
U.S. application Ser. No. 13/730,352, filed Dec. 28, 2012;
U.S. application Ser. No. 13/730,459, filed Dec. 28, 2012;
U.S. application Ser. No. 13/730,495, filed Dec. 28, 2012;
U.S. application Ser. No. 13/730,530, filed Dec. 28, 2012;
U.S. application Ser. No. 13/730,754, filed Dec. 28, 2012;
U.S. application Ser. No. 13/730,559, filed Dec. 28, 2012;
U.S. application Ser. No. 13/730,579, filed Dec. 28, 2012;
U.S. application Ser. No. 13/730,593, filed Dec. 28, 2012;
U.S. application Ser. No. 13/730,759, filed Dec. 28, 2012;
U.S. application Ser. No. 13/730,627, filed Dec. 28, 2012;
U.S. application Ser. No. 13/730,644, filed Dec. 28, 2012;
U.S. application Ser. No. 13/730,656, filed Dec. 28, 2012;
U.S. application Ser. No. 13/730,670, filed Dec. 28, 2012;
U.S. application Ser. No. 13/730,691, filed Dec. 28, 2012;
U.S. application Ser. No. 13/730,702, filed Dec. 28, 2012;
U.S. application Ser. No. 13/730,718, filed Dec. 28, 2012; and
U.S. application Ser. No. 13/730,734, filed Dec. 28, 2012.

Each of the above referenced application is hereby incorporated herein by reference in its entirety.

FIELD OF THE DISCLOSURE

Certain embodiments of the disclosure relate to communication systems. More specifically, certain embodiments of the disclosure relate to a method and system for automatic content recognition integration for smart televisions (smartTVs) and mobile communication devices.

BACKGROUND OF THE DISCLOSURE

A significant portion of some businesses' revenue is derived from advertisements. The manner in which these advertisements are presented to viewers and the way these viewers interact with and/or perceive the presented advertisements is very important to the success of these businesses.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and/or method is provided for automatic content recognition integration for smart televisions (smartTVs) and mobile communication devices, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
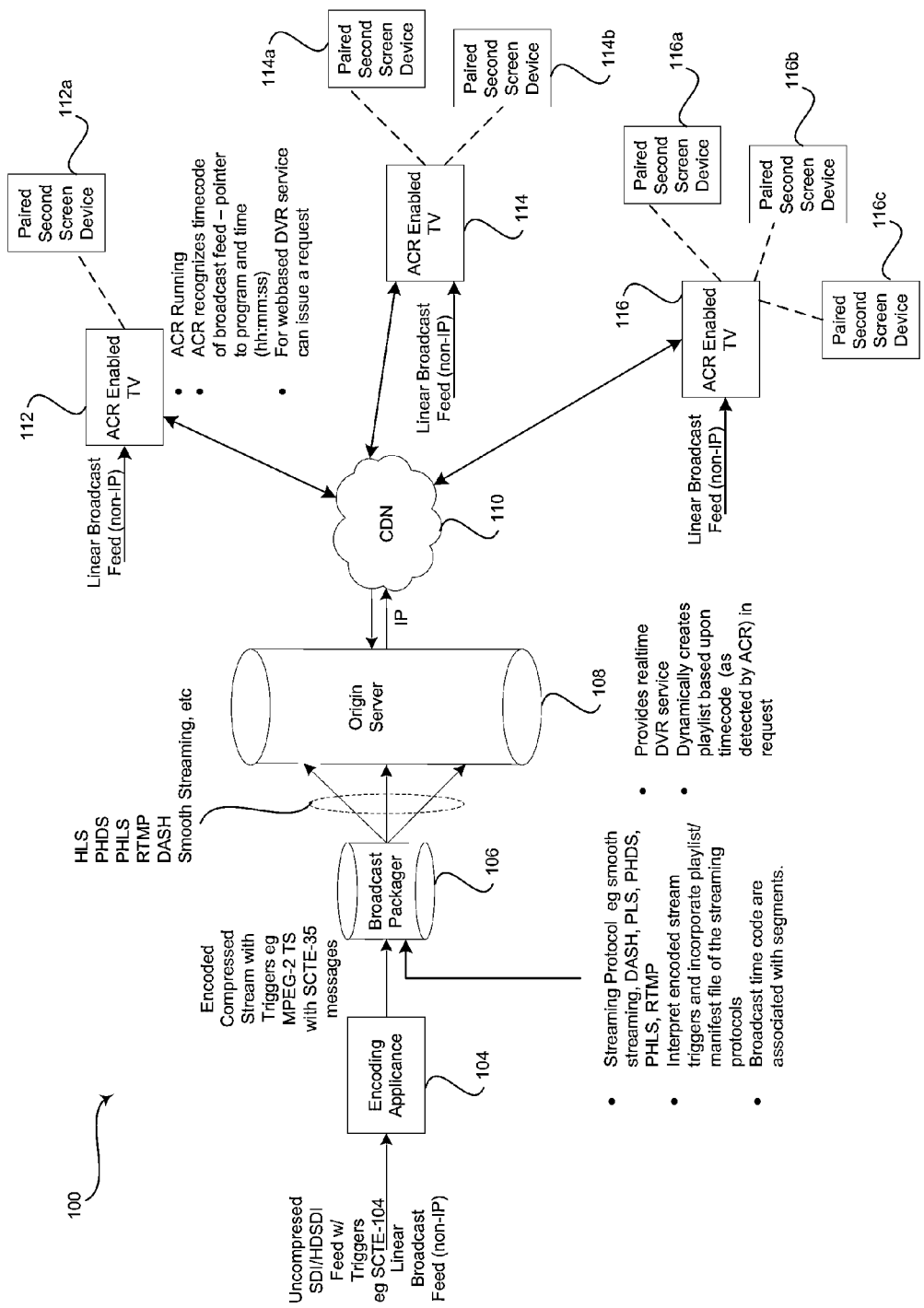
FIG. 1 is a diagram that illustrates an exemplary system for automatic content recognition (ACR) integration for smart-TVs and mobile communication devices, in accordance with an exemplary embodiment of the disclosure.

Certain embodiments of the disclosure may be found in a method and system for automatic content recognition integration for smart televisions (smartTVs) and mobile communication devices. In various exemplary embodiments of the disclosure, a second screen communication device that is paired with an automatic content recognition enabled display communication device is operable to launch an interactive application in response to and/or based on an invitation cue or notification. In an exemplary embodiment of the disclosure, the second screen communication device may comprise a smart phone and a tablet and the automatic content recognition enabled display communication device may comprise an automatic content recognition enabled smart television. The second screen communication device may be paired with the automatic content recognition enabled display communication device may comprise an automatic content recognition enabled smart television. The pairing may, for example, enable IP-based communication between the second screen communication device and the automatic content recognition enabled display communication device. The invitation cue may be generated and presented by the automatic content recognition enabled display communication device while the automatic content recognition enabled display communication device is displaying linear broadcast content. The linear broadcast content is a non-IP based broadcast content. The invitation cue may comprise a visual and/or an audio cue and may be generated based on an advertisement, which comprises a portion of the linear broadcast content that is displayed by the automatic content recognition enabled display communication device. The interactive application, which is launched on the second screen communication device, enables interaction with interactive content displayed by a user interface on the second screen communication device based on the invitation cue presented on the automatic content recognition enabled display communication device. The second screen communication device may generate one or more control elements that enable the interaction with the interactive content displayed by the user interface on the second screen communication device. The interaction with the interactive content may be controlled utilizing the generated one or more control elements. The generated one or more control elements may be utilized to resume display of an IP-based digital stream, which corresponds to the linear broadcast content, on said automatic content recognition enabled display communication device.

The interactive content displayed on the second screen communication device comprises subject matter that may be representative of the advertisement. The second screen communication device may also be operable to control the interaction with the interactive content utilizing the generated one or more control elements in order to cause the interactive content displayed by the user interface on the second screen communication device to be concurrently displayed on the automatic content recognition enabled display communication device. The second screen communication device may be operable to interact with additional interactive content, which is displayed by the user interface on the second screen communication device and is associated with the invitation cue, subsequent to resuming the displaying of the IP-based digital stream content on the automatic content recognition enabled display communication device. The second screen communication device is operable to receive a notification that indicates that the interactive content is available for display by the user interface on the second screen communication device. In instances where the interactive application is not installed on the second screen communication device prior to the launching, the second screen communication device may be operable to download and/or install the interactive application on the second screen communication device. The second screen communication device may be operable to defer the interaction with the interactive content utilizing the generated one or more control elements.

FIG. 1 is a diagram that illustrates an exemplary system for automatic content recognition integration for smartTVs and mobile communication devices, in accordance with an exemplary embodiment of the disclosure. Referring to FIG. 1, there is shown a exemplary system for automatic content recognition integration for smartTVs and mobile communication devices 100 comprising an encoding appliance 104, a broadcast packager 106, an origin server 108, a content delivery network (CDN) 110, a plurality of ACR-enabled smartTVs 112, 114, 116 and a plurality of paired second screen communication devices 112a, 114a, 114b, 116a, 116b, 116c.

The encoding appliance 104 may comprise suitable logic, circuitry, interfaces and/or code that may be operable to encode a received feed into one or more encoded formats and accordingly generate one or more corresponding output encoded feeds. The encoding appliance 104 may be operable to receive an uncompressed (high definition) serial digital interface (HDSDI) protocol feed, which may comprise embedded metadata triggers that can include frame accurate declarations of advertisement and program time boundaries. The uncompressed (high definition) serial digital interface (HDSDI) protocol feed comprises a linear broadcast feed and as such, is a non-Internet Protocol (non-IP) feed or stream. In an exemplary embodiment of the disclosure, the serial digital interface (SDI/HDSDI) protocol feed may comprise a SCTE-104 SDI protocol feed. SCTE-104 is a standardized metadata insertion specification that may be utilized to declare digital insertion points of program and advertisement content in high definition (HD) SDI streams. SCTE-104 enables the insertion of advertisements (commercials) and custom content such as the ACR-based triggers and assets in the HD SDI broadcast stream. The encoding appliance 104 may be operable to encode the received linear broadcast feed and generate an encoded compressed stream with content triggers translated from the broadcast SCTE-104 messages. In an exemplary embodiment of the disclosure, the encoding appliance 104 may be operable to encode the received linear broadcast feed and generate an MPEG-2 transport stream (TS) with SCTE-35 messages. SCTE-35 is a standardized advertisement insertion specification that is utilized to define, for example, cue and insertion points in MPEG-2 transport streams.

The broadcast packager 106 may comprise suitable logic, circuitry, interfaces and/or code that may be operable to receive the encoded compressed stream with the SCTE-35 triggers and packages the content in one or more IP based web delivery formats. In an embodiment of the disclosure, the broadcast packager 106 may be operable to package at least a portion of the encoded compressed stream with the SCTE-35 triggers into streaming or segmented streaming protocol formats. Exemplary streaming or segmented streaming protocol formats may comprise, for example, hypertext transport protocol (HTTP) Live Streaming (HLS) format, Microsoft smooth streaming, Dynamic Adaptive Streaming over HTTP (DASH) (also referred to as MPEG-DASH), Protected HTTP Dynamic Streaming (PHDS), Protected HTTP Live Streaming (PHLS), and real time messaging protocol (RTMP). The broadcast packager 106 may be operable to interpret the encoded stream triggers and incorporate playlists and/or manifests file for the streaming protocols. The broadcast packager 106 may also be operable to handle the processing and insertion of broadcast time codes as obtained from an internal system clock or external NTP (Network Time Protocol) based source into the packaged content for the various broadcast stream formats. In the case of segmented streaming protocols (e.g., HLS, DASH, Microsoft Smooth Streaming, and HDS/pHDS) the packager may use broadcast timecodes as part of the naming convention of the stream 'chunks' so as to enable DVR playback via dynamic playlist creation. The packaged content for the various broadcast stream formats generated by the broadcast packager 106 may comprise one or more IP-based digital streams.

The origin server 108 may comprise suitable logic, circuitry, interfaces and/or code that may be operable to store the packaged content for the various IP-based broadcast stream formats. The origin server 108 may also be operable to post assets (e.g. IP-based version of the asset with corresponding metadata declarations in the manifest files) to one or more servers or storage devices within the content delivery network 110. The assets may comprise, for example, graphics, banners, overlays, text, audio, video and so on, which may be utilized by the ACR-enabled smartTVs 112, 114, 116. As noted in the diagram, the origin server 108 may also be operable to provide a real time DVR service via dynamic playlist creation based upon start and stop timecodes in the request. This may also be provided by the content delivery network 110.

The content delivery network 110 may comprise suitable logic, circuitry, interfaces and/or code that may be operable to deliver IP-based content from the origin server 108 to each of the ACR-enabled smartTVs 112, 114, 116. Although not shown, the content delivery network 110 may comprise one or more servers, store devices, switches, transport devices and medium that enables delivery of the IP-based content from the origin server 108 to the ACR-enabled smartTVs 112, 114, 116. In an embodiment of the disclosure, the content delivery network 110 may comprise a cloud-based content delivery network. The content delivery network 110 may be operable to handle storage and/or distribution of the assets that may be posted from the origin server 108. The content delivery network 110 may be operable to handle communication and/or distribution of the assets, which may comprise, for example, graphics, banners, overlays, text, audio and/or video to the ACR-enabled smartTVs 112, 114, 116. It may be operable to provide a dynamic DVR service as mentioned above.

Each of the plurality of ACR-enabled smartTVs 112, 114, 116 may comprise suitable logic, circuitry, interfaces and/or code that may be operable to consume content from a linear broadcast feed. Each of the plurality of ACR-enabled smartTVs 112, 114, 116 may be operable to receive IP-based broadcast content from the origin server 108 and/or Internet based multimedia content, which may be delivered via the content delivery network 110. Each of the ACR-enabled smartTVs 112, 114, 116 may be operable to handle automatic content recognition for the delivered broadcast content.

The ACR-enabled smartTVs 112, 114, 116 may comprise connected TVs with paired devices such as tablets, and second screen communication devices such as Smartphones and tablets, for example. The ACR-enabled smartTVs 112, 114, 116 may be referred to as viewer devices, for example. Since an ACR system may comprise a plurality of fingerprint match systems, each of which supports a different ACR or fingerprint technology, the ACR-enabled smartTVs 112, 114, 116 that support a particular fingerprint technology are operable to communicate with a compatible corresponding fingerprint match system. Moreover, when a secondary or paired device, for example, the paired second screen communication devices 112a, 114a, 114b, 116a, 116b, 116c, supports a particular fingerprint technology, the secondary or paired device may also be operable to communicate with the corresponding fingerprint match system that supports the compatible fingerprint technology. U.S. application Ser. No. 13/730,352, which was filed on Dec. 28, 2012 discloses a fingerprint match system and is hereby incorporated herein by reference in its entirety. An abstraction layer may refer to, for example, the ability of an ACR system to assign the same event identifiers to different sets of video fingerprints that are generated by different video fingerprint technologies. That is, by appropriately timing the assignment of event identifiers to multiple sequences of video fingerprints that are generated from the same video content but with different video fingerprinting technologies, a single ACR system is able to support video fingerprinting technologies from multiple vendors. This approach allows the ACR system to be both flexible and scalable with respect to fingerprint technology vendors, Interactive event identifiers may be utilized in a television system and/or in a web system to trigger interactive events. When an ACR event is triggered in one of the ACR-enabled smartTVs 112, 114, 116, an invitation may be provided to one or more of the plurality of paired second screen communication devices 112a, 114a, 114b, 116a, 116b, 116c, which enables secondary content associated with the delivered broadcast to be consumed by one or more of the plurality of paired second screen communication devices 112a, 114a, 114b, 116a, 116b, 116c. For example, an ACR event may be triggered in the ACR-enabled smartTV 114 while delivered linear broadcast content is being consumed and presented by the ACR-enabled smartTV 114 and an invitation or notification may be displayed on the ACR-enabled smartTV 114 and/or provided to the paired second screen communication device 114b. The invitation or notification may indicate that corresponding secondary content associated with the delivered linear broadcast content being consumed by the ACR-enabled smartTVs 114 may be available for consumption by the paired second screen communication device 114b.

Each of the plurality of paired second screen communication devices 112a, 114a, 114b, 116a, 116b, 116c may comprise suitable logic, circuitry, interfaces and/or code that may be operable to handle the consumption of multimedia content. Each of the paired second screen communication devices 112a, 114a, 114b, 116a, 116b, 116c may comprise mobile communication devices. A second screen communication device, which may be paired with one or more of the ACR-enabled smartTVs, may be operable to handle consumption of secondary content associated with the delivered broadcast that is consumed by one or more of the plurality of paired second screen communication devices. The second screen communication device 112a may be paired with the ACR-enabled television 112. The second screen communication devices 114a, 114b may be paired with the ACR-enabled television 114. The second screen communication devices 116a, 116b, 116c may be paired with the ACR-enabled television 116. A second screen communication device, which may be paired with an ACR-enabled smartTV, may be operable to receive an indication that secondary content, which may be associated with the delivered broadcast being consumed by the ACR-enabled smartTV, may be available for consumption by the second screen communication device. For example, the second screen communication device 112a may be operable to receive an indication or notification when secondary content associated with the delivered broadcast being consumed by the ACR-enabled smartTV 112, may be available for consumption by the second screen communication device 112a. The indication may comprise an audio and/or visual notification. In this regard, the indication or notification may comprise one or more tones, a banner, a pop-up window, an animation, a short message service (SMS) alert, an audio and/or visual message, and/or other type of notification.

In operation, a viewer may be consuming broadcast content that is being delivered to and presented on the ACR-enabled smartTV 116 via a linear broadcast feed. An ACR event may be triggered during consumption and/or presentation of the broadcast content in the ACR-enabled smartTV 116. The triggered ACR event may cause the generation of an invitation or notification on the ACR-enabled smartTV 116 and/or on one or both of the paired second screen communication devices 116a, 116b. The invitation or notification may indicate that corresponding secondary content associated with the delivered broadcast content being consumed by the ACR-enabled smartTVs 116 may be available for consumption by the paired second screen communication devices 116a, 116b and/or 116c. The viewer may acknowledge the notification on the paired second screen communication device 116a in order to initiate consumption of the secondary content on the paired second screen communication device 116a. The viewer may optionally defer consumption of the secondary content on the paired second screen communication device 116a or the paired second screen communication device 116b until a subsequent time. In accordance with some embodiments of the disclosure, two viewers may be operable to utilize corresponding versions of the paired second screen communication devices 116a, 116b to concurrently consume the secondary content and may share the same viewer experience (e.g. multiplayer game, poll, collaborative gaming, trivia, etc.). In accordance with some embodiments of the disclosure, two viewers may be operable to utilize corresponding versions of the paired second screen communication devices 116a, 116b to independently consume the secondary content and may have the same viewer experience or different viewer experiences.

In accordance with various embodiments of the disclosure, the system for automatic content recognition integration for smartTVs and mobile communication devices 100 is operable to generate one or more IP-based digital streams that corresponds to a linear feed or linear broadcast feed. The generation of the IP-based digital streams may not necessarily be part of the automatic content recognition system. Accordingly, the IP-based digital streams may simply be part of the IP based versions of the broadcast stream. In general, the linear feed or linear broadcast feed may be a non-IP based feed. However, in some systems, the linear feed or linear broadcast feed may be an IP based feed. Accordingly, the linear feed or linear broadcast feed may be generically referred to as a live feed, which may be delivered by the multi-channel video programming distributor (MVPD), which is described with respect to, for example, FIG. 3. In instances when the viewer may be consuming the secondary content on a paired second screen communication device, it may be desirable for the viewer to return to consuming the broadcast content in the linear feed at the point where they were invited to interact with the secondary content. In this regard, the system for automatic content recognition integration for smartTVs and mobile communication devices 100 may switch from providing the broadcast content via the linear feed to providing the corresponding content via an IP-based digital stream whose source may be the content provider, the multi-channel video programming distributor (MVPD), which is described with respect to, for example, FIG. 3, and/or a third party.

Figure 2:
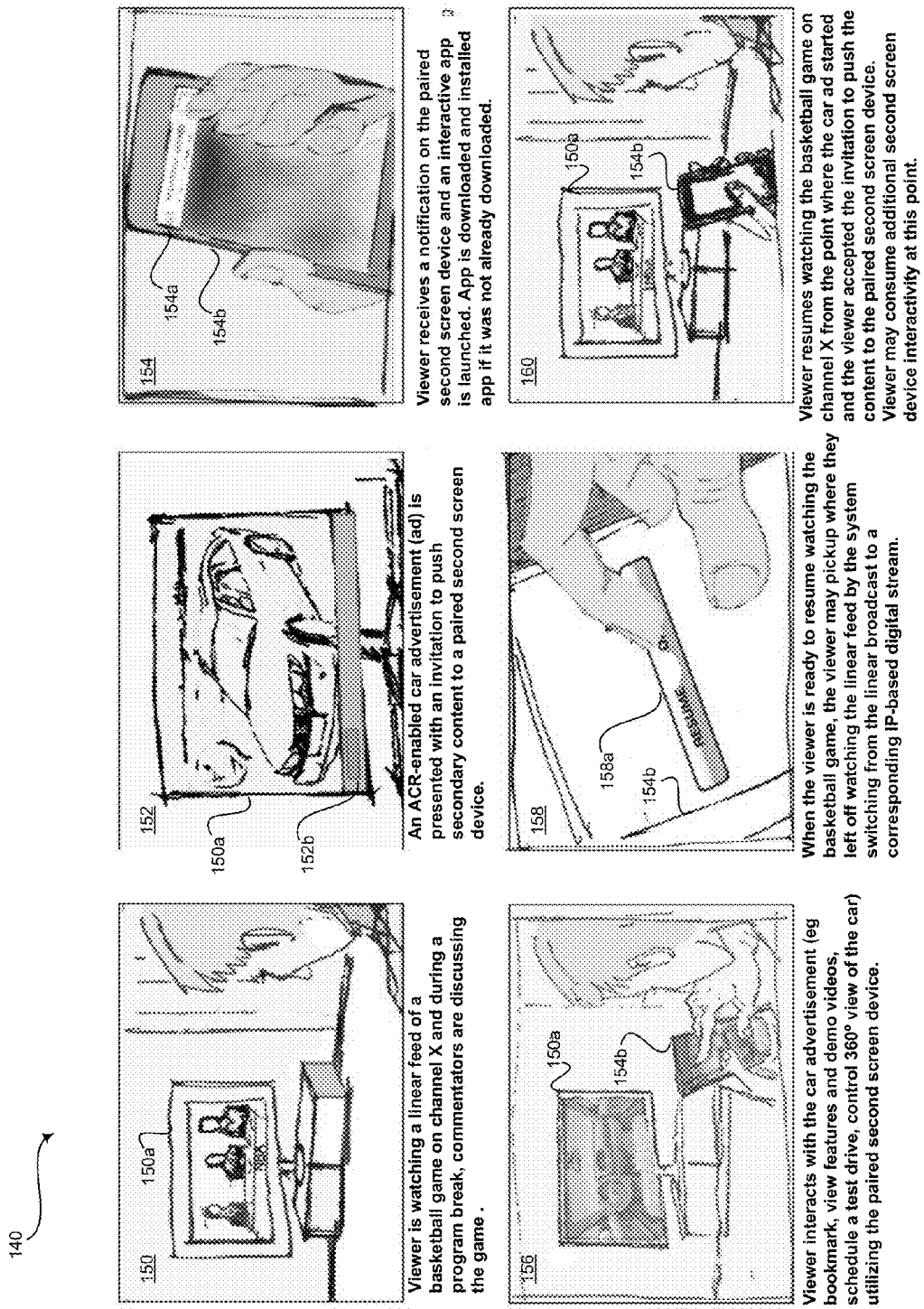
FIG. 2 is a flow diagram that illustrates an exemplary scenario for user interaction in a system for automatic content recognition integration for an ACR-enabled smartTV and a mobile communication device, in accordance with an exemplary embodiment of the disclosure.

FIG. 2 is a flow diagram that illustrates an exemplary scenario for user interaction in a system for automatic content recognition integration for an ACR-enabled smartTV and a mobile communication device, in accordance with an exemplary embodiment of the disclosure. Referring to FIG. 2, there is shown flow diagram 140 comprising a plurality of views, namely, views 150, 152, 154, 156, 158 and 160. FIG. 2 also shows an ACR-enabled smartTV 150a, a paired second screen communication device 154b, an ACR banner 152b and a resume button or icon 158a.

In view 150, a viewer is watching a linear feed of a basketball game on channel X and during a break (e.g. end of half, timeout, etc.) in the game, commentators are illustrated discussing the basket game. In view 150, the viewer is watching the basketball game on the ACR-enabled smartTV 150a. The linear feed is a live broadcast feed as delivered by the MVPD system. The MVPD system is described with respect to, for example, FIG. 3.

In view 152, an ACR-enabled car advertisement (ad) is presented on the ACR-enabled smartTV 150a with an invitation to push secondary content to a paired second screen communication device. The invitation may be presented by the ACR banner 152b. A timecode for the linear feed is determined.

In view 154, the viewer receives a notification 154a on the paired second screen communication device 154b and an interactive application is launched on the paired second screen communication device 154b. In instances where the interactive application was not previously downloaded and installed in the paired second screen communication device 154b, the interactive application may be downloaded and installed on the paired second screen communication device 154b.

In view 156, the viewer interacts with the car advertisement utilizing the interactive application that was launched in the paired second screen communication device 154b. The interaction with the car advertisement, which is occurring on the paired second screen communication device 154b, may concurrently be presented on the ACR-enabled smartTV 150a. In some instances, the interaction with the car advertisement, which is occurring on the paired second screen communication device 154b, is displayed only on the paired second screen communication device 154b. The interaction may comprise, for example, saving a bookmark, selecting and/or viewing features such as model, color, option package, and trim, viewing pertinent demo videos, scheduling a test drive and/or controlling a 360° view of the car in the car advertisement utilizing the paired second screen communication device 154b.

In view 158, when the viewer is ready to resume watching the basketball game on the ACR-enabled smartTV 150a, the viewer may pickup where they left off watching the linear feed by the system switching from the linear broadcast to a corresponding IP-based digital stream. The viewer may activate the resume button or icon 158a in order to initiate the switch from the linear broadcast to the corresponding IP-based digital stream.

In view 160, the viewer resumes watching the basketball game on channel X from the point where the car advertisement started and the viewer accepted the invitation to push the content to the paired second screen communication device. The viewer may consume additional second screen communication device interactivity at this point.

The interactive application may generate and present the viewer with various options and tools that may enable the viewer to customize and view various features of the car, interact with the car, playing a video of the car on the paired second screen communication device and/or concurrently on the ACR-enabled TV. In this regard, in one aspect of the disclosure, the user of the paired second screen communication device may select an option to interact with the car advertisement on the paired second screen communication device but the interaction may not be replicated on the screen of the ACR-enabled TV. In another aspect of the disclosure, the user of the paired second screen communication device may select an option to interact with the car advertisement on the paired second screen communication device and the interaction may be replicated or incorporate an on screen component (e.g. a game that permits shooting baskets from the secondary device but the hoop is on the smartTV) on the ACR-enabled TV. In other words, the interaction on the paired second screen communication device is concurrently displayed OR part of an on screen experience on the ACR-enabled TV.

Figure 3:
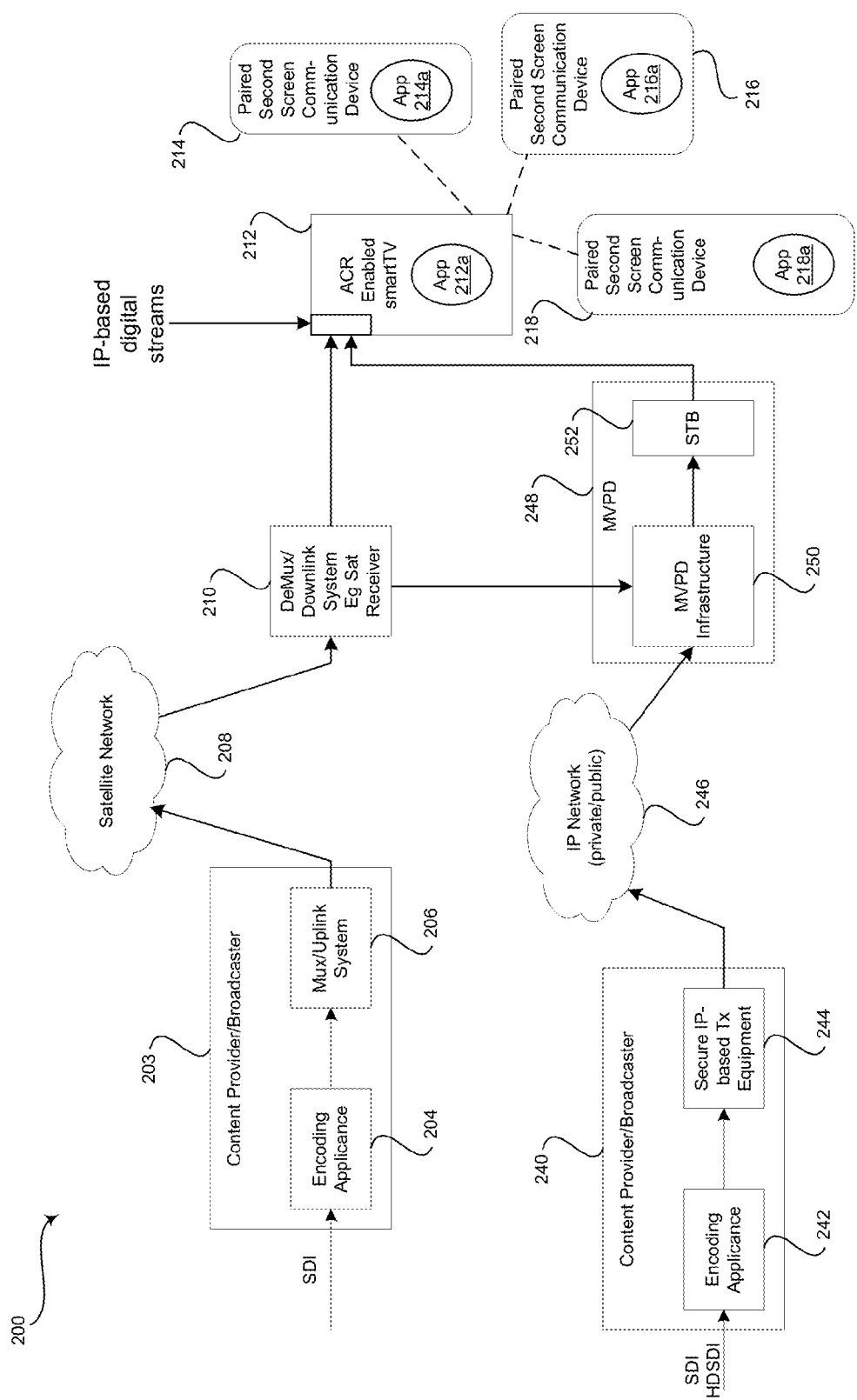
FIG. 3 is a diagram that illustrates an exemplary system for automatic content recognition (ACR) integration for smart-TVs and mobile communication devices, which utilizes a plurality of satellite broadcast feeds, in accordance with an exemplary embodiment of the disclosure.

FIG. 3 is a diagram that illustrates an exemplary system for automatic content recognition (ACR) integration for smartTVs and mobile communication devices, which utilizes a plurality of satellite broadcast feeds, in accordance with an exemplary embodiment of the disclosure. Referring to FIG. 3, there is shown a system for automatic content recognition (ACR) integration for smartTVs and mobile communication devices 200, which utilizes a satellite broadcast feed. The system for automatic content recognition (ACR) integration for smartTVs and mobile communication devices 200 comprises a content provider/broadcaster 203, a satellite network 208, a content provider/broadcaster 240, and IP network 246, a multichannel video programming distributor (MVPD) 248, an ACR-enabled smartTV 212, and a plurality of paired second screen communication devices 214, 216, 218. The content provider/broadcaster 203 comprises an encoding appliance 204, and a multiplexer (mux) and uplink system 206. The content provider/broadcaster 240 comprises an encoding appliance 242, and secure IP-based transmission equipment 244. The MVPD 240 may comprise an MVPD infrastructure 250 and a set-top box (STB) 252. The system for automatic content recognition (ACR) integration for smartTVs and mobile communication devices 200, which utilizes a satellite broadcast feed is operable to deliver a linear broadcast feed to one or more ACR-enabled smartTVs such as the ACR-enabled smartTV 212.

The content provider/broadcaster 203 may be operable to generate content, which may be delivered to the ACR-enabled smartTV 212 via the satellite network 208.

The encoding appliance 204 may comprise suitable logic, circuitry, interfaces and/or code that may be operable to encode a received feed into one or more encoded formats and accordingly generate one or more corresponding output encoded feeds. The encoding appliance 204 may be operable to receive an uncompressed (high definition) serial digital interface (HDSDI) protocol feed, which may comprise embedded metadata triggers that can include frame accurate declarations of advertisement and program time boundaries. The uncompressed (high definition) serial digital interface (HDSDI) protocol feed comprises a linear broadcast feed and as such, is a non-Internet Protocol (non-IP) feed or stream. In an exemplary embodiment of the disclosure, the serial digital interface (SDI/HDSDI) protocol feed may comprise a SCTE-104 SDI protocol feed. SCTE-104 is a standardized metadata insertion specification that may be utilized to declare digital insertion points of program and advertisement content in high definition (HD) SDI streams. The encoding appliance 204 may be operable to encode the received linear broadcast feed and generate an encoded compressed stream with content triggers translated from the broadcast SCTE-104 messages. In an exemplary embodiment of the disclosure, the encoding appliance 104 may be operable to encode the received linear broadcast feed and generate an MPEG-2 transport stream (TS) with SCTE-35 messages. The encoding appliance 204 may be substantially similar to the encoding appliance 104, which is shown and described with respect to FIG. 1.

The multiplexer and uplink system 206 may comprise suitable logic, circuitry, interfaces and/or code that may be operable to receive the encoded output feeds from the encoding appliance 204 and multiplex them into a multiplexed encoded feed for communication to the satellite network 208. In accordance with an embodiment of the disclosure, the multiplexer and uplink system 206 may comprise, for example, a satellite headend. It should be noted that in some embodiments of the disclosure, a content provider's live broadcast stream may be delivered directly via an IP based connection to the multichannel video programming distributor (MVPD), which is described with respect to, for example, FIG. 3, directly.

The satellite network 208 may comprise one or more satellites that may be operable to receive the multiplexed encoded feed from the multiplexer and uplink system 206 and broadcast the corresponding content via one or more downlink satellite channels. In this regard, the satellite network 208 may comprise suitable logic, circuitry, interfaces, devices and/or code that may be operable to receive the multiplexed encoded feed from the multiplexer and uplink system 206 and broadcast the corresponding content via one or more downlink satellite RF channels.

The demultiplexer and downlink system 210 may comprise suitable logic, circuitry, interfaces and/or code that may be operable to receive and demodulate the one or more downlink satellite RF channels comprising the multiplexed encoded feed. The output from the demultiplexer and downlink system 210 may be communicated to the ACR enabled smartTV 212, which may be operable to tune to and decrypt, if necessary, the one or more downlink satellite RF channels. The output from the demultiplexer and downlink system 210 may also be communicated to the multichannel video programming distributor 248, which may be a radio frequency (RF), an intermediate frequency (IF), satellite, cable, and/or IP based distribution system. In this regard, the demultiplexer and downlink system 210 may be operable to communicate one or more corresponding demodulated downlink satellite RF channels to the multichannel video programming distributor 248, which may distribute and deliver live linear broadcast content, through the multichannel video programming distributor infrastructure 250, to the ACR-enabled smartTV 212 via the set-top box 252.

The ACR-enabled smartTV 212 may comprise suitable logic, circuitry, interfaces and/or code that may be operable to consume the live linear feed of the broadcast content from the demux/downlink system 210 and/or Internet based multimedia content, which may be delivered via the satellite network 208. The ACR-enabled smartTV 212 may also be operable to consume live linear feed of the broadcast content from the set-top box 252, and/or Internet based multimedia content, which may be delivered via the IP network 246. The ACR-enabled smartTV 212 may be operable to handle automatic content recognition for the delivered broadcast content. The ACR-enabled smartTV 212 may be substantially similar to each of the ACR-enabled smartTVs 112, 114, 116, which are shown and described with respect to FIG. 1.

Each of the plurality of paired second screen communication devices 214, 216, 218 may comprise suitable logic, circuitry, interfaces and/or code that may be operable to handle the consumption of multimedia content. Each of the plurality of paired second screen communication devices 214, 216, 218 may comprise mobile communication devices and may be paired with the ACR-enabled smartTV 212. In this regard, each of the plurality of paired second screen communication devices 214, 216, 218, which may be paired with the ACR-enabled smartTV 212, may be operable to consume and interact with secondary content associated with the linear delivered broadcast content, which is being consumed by the ACR-enabled smartTV 212. The paired second screen communication devices 214, 216, 218 may be paired with the ACR-enabled smartTV 212. Each of the plurality of paired second screen communication devices 214, 216, 218 may be substantially similar to the paired second screen communication devices 116a, 116b, 116c, which are disclosed and described with respect to FIG. 1.

One or more of the plurality of paired second screen communication devices 214, 216, 218 may be operable to receive an indication that secondary content, which may be associated with the linear delivered broadcast content being consumed by the ACR-enabled smartTV 212, may be available for consumption by the paired second screen communication device. For example, one or more of the plurality of paired second screen communication devices such as the second screen communication device 214 may be operable to receive an indication or notification when secondary content associated with the linear delivered broadcast being consumed by the ACR-enabled smartTV 212, may be available for consumption by the second screen communication device 214.

Each of the plurality of paired second screen communication devices 214, 216, 218 may comprise an application (app), which is operable to handle the notification, communication and interaction with the secondary content that is associated with the linear delivered broadcast content being consumed by the ACR-enabled smartTV 212. In this regard, the paired second screen communication device 214 may comprise an application 214a, the paired second screen communication device 216 may comprise an application 216a and the paired second screen communication device 218 may comprise an application 218a. The applications 214a, 216a, 218a may be operable to receive a signal or message, which serves as an indication or notification that the secondary content associated with the delivered broadcast being consumed by the ACR-enabled smartTV 212 is available for presentation on the corresponding paired second screen communication devices 214, 216, 218. The applications 214a, 216a, 218a running on the paired second screen communication devices 214, 216, 218 may comprise an application, which runs on top of an operating system of the corresponding paired second screen communication devices 214, 216, 218 or an application which may be integrated as part of an operating system of the corresponding paired second screen communication devices 214, 216, 218. The applications 214a, 216a, 218a may run in the background or may be activated when the secondary content associated with the delivered broadcast being consumed by the ACR-enabled smartTV 212 is available. The applications 214a, 216a, 218a may comprise a user interface that may be operable to generate and/or display one or more control elements such as buttons, icons, visual aids and/or audio aids that enables interaction with the secondary content displayed the corresponding paired second screen communication devices 214, 216, 218.

The content provider/broadcaster 240 may be operable to generate content, which may be delivered to the ACR-enabled smartTV 212 via the IP network 246.

The encoding appliance 242 may comprise suitable logic, circuitry, interfaces and/or code that may be operable to encode a received feed into one or more encoded formats and accordingly generate one or more corresponding output encoded feeds. The encoding appliance 242 may be operable to receive an uncompressed (high definition) serial digital interface (HDSDI) protocol feed, which may comprise embedded metadata triggers that can include frame accurate declarations of advertisement and program time boundaries. The uncompressed (high definition) serial digital interface (HDSDI) protocol feed comprises a linear broadcast feed and as such, is a non-Internet Protocol (non-IP) feed or stream. In an exemplary embodiment of the disclosure, the serial digital interface (SDI/HDSDI) protocol feed may comprise a SCTE-104 SDI protocol feed. SCTE-104 is a standardized metadata insertion specification that may be utilized to declare digital insertion points of program and advertisement content in high definition (HD) SDI streams. The encoding appliance 204 may be operable to encode the received linear broadcast feed and generate an encoded compressed stream with content triggers translated from the broadcast SCTE-104 messages. In an exemplary embodiment of the disclosure, the encoding appliance 242 may be operable to encode the received linear broadcast feed and generate an MPEG-2 transport stream (TS) with SCTE-35 messages. The encoding appliance 242 may be substantially similar to the encoding appliance 104, which is shown and described with respect to FIG. 1.

The secure IP-based transmission equipment 244 may comprise suitable logic, interfaces, and/or code that may be operable to receive secure the generated MPEG-2 transport stream (TS) with SCTE-35 messages, which are received from the encoding appliance 242. In this regard, the secure IP-based transmission equipment 244 may be operable to encrypt the content from the encoding appliance 242, which comprises the MPEG-2 transport stream (TS) with SCTE-35 messages, so that it may be securely transported via the IP network 246.

The IP-network 246 may comprise suitable devices and/or interfaces that may be operable to receive content from the content provider/broadcaster 240 and communicate the received content to the multichannel video programming distributor 248. In this regard, the IP-network 246 may be operable to handle the communication of encrypted content, which may be received from the secure IP-based transmission equipment 244, to the multichannel video programming distributor 248.

The multichannel video programming distributor 248 may comprise suitable devices and/or interfaces that may be operable to deliver live linear content to the ACR-enabled smartTV 212 via the set-top box 252. The multichannel video programming distributor 248, may comprise a radio frequency (RF), an intermediate frequency (IF), satellite, cable, and/or IP based distribution system. The MVPD 248 may be operable to receive live linear content from the content provider/broadcaster 240 via the IP network 246. The MVPD 248 may also be operable to receive live linear content from the content provider/broadcaster 203 via the satellite network 208 and the DeMux/Downlink system 210. The MVPD 248 may comprise a MVPD infrastructure 250 and the set-top box (STB) 252.

The multichannel video programming distributor (MVPD) infrastructure 250 may comprise suitable devices and/or interfaces that may be operable to receive live linear content from the content providers/broadcasters 203, 240. In this regard, the MVPD infrastructure 250 may comprise, for example, satellite and/or cable equipment and infrastructure. The MVPD infrastructure 250 may receive live linear content from the satellite network 208 via the DeMux/Downlink system 210, and also from the IP network 246. The MVPD infrastructure 250 may be operable to communicate the received live linear content to the set-top box 252.

The set-top box (STB) 252 may comprise suitable logic, circuitry, interfaces and/or code that may be operable to receive linear content, which may be encrypted for secured, from the MVPD infrastructure 250. The set-top box (STB) 252 may be operable to tune to one or more channels and decrypt the live linear content. The decrypted live linear content may be communicated from the set-top box 252 to the ACR-enabled smartTV 212. The set-top box 252 may comprise a hardware set-top box or a virtual set-top box.

In operation, a viewer may be consuming linear broadcast content that is being delivered to and presented on the ACR-enabled smartTV 212 via the satellite network 208. An ACR event may be triggered during consumption and/or presentation of the linear delivered broadcast content in the ACR-enabled smartTV 212. The triggered ACR event may cause the generation of an invitation or notification on one or both of the paired second screen communication devices 214, 216, 218. The invitation or notification may indicate that corresponding secondary content associated with the delivered linear broadcast content being consumed by the ACR-enabled smartTVs 212 may be available for consumption by the one or more of the plurality of paired second screen communication devices 214, 216, 218. In an exemplary embodiment of the disclosure, the viewer may acknowledge the notification on the paired second screen communication device 214 in order to initiate consumption of the secondary content on the paired second screen communication device 214. The consumption of the delivered linear broadcast content by the ACR-enabled smartTVs 212 may be paused (as observed by the viewer) at about the time the viewer initiates consumption of the secondary content on the paired second screen communication device 214. The viewer may optionally defer consumption of the secondary content on the paired second screen communication device 214 until a subsequent time utilizing the application 214a.

In instances where the viewer has completed interacting with the secondary content on the paired second screen communication device 214, the viewer may resume consumption of the linear broadcast content on the ACR-enabled smartTV 212. The viewer may resume the consumption of the linear broadcast content on the ACR-enabled smartTV 212 to the current point of the linear broadcast. In this regard, the viewer misses out on the content that was presented in the linear broadcast content between the time at which the delivered linear broadcast content was paused on the ACR-enabled smartTV 212 and the time just before resuming consumption of the linear broadcast content on the ACR-enabled smartTV 212. In accordance with various embodiments of the disclosure, the viewer may resume the consumption of the linear broadcast content on the ACR-enabled smartTV 212 to the time at which the delivered linear broadcast content was paused on the ACR-enabled smartTV 212. In this regard the viewer does not miss out on any content that was presented in the linear broadcast content after the time at which the delivered linear broadcast content was paused on the ACR-enabled smartTV 212. The ACR-enabled smartTV 212 may be operable to switch from the linear broadcast content and consume content from a corresponding IP-based digital stream. Once the switch to the corresponding IP-based digital stream occurs, the ACR-enabled smartTV 212 presents the broadcast content from the corresponding time and position at which the delivered broadcast content in the linear feed was paused.

In accordance with some embodiments of the disclosure, two viewers may be operable to utilize corresponding versions or implementations of the paired second screen communication devices 214, 216 to concurrently consume the secondary content and may share the same viewer experience. In accordance with some embodiments of the disclosure, two viewers may be operable to utilize corresponding implementations or versions of the paired second screen communication devices 216, 218 to independently consume the secondary content and may have the same viewer experience or different viewer experiences.

Figure 4:
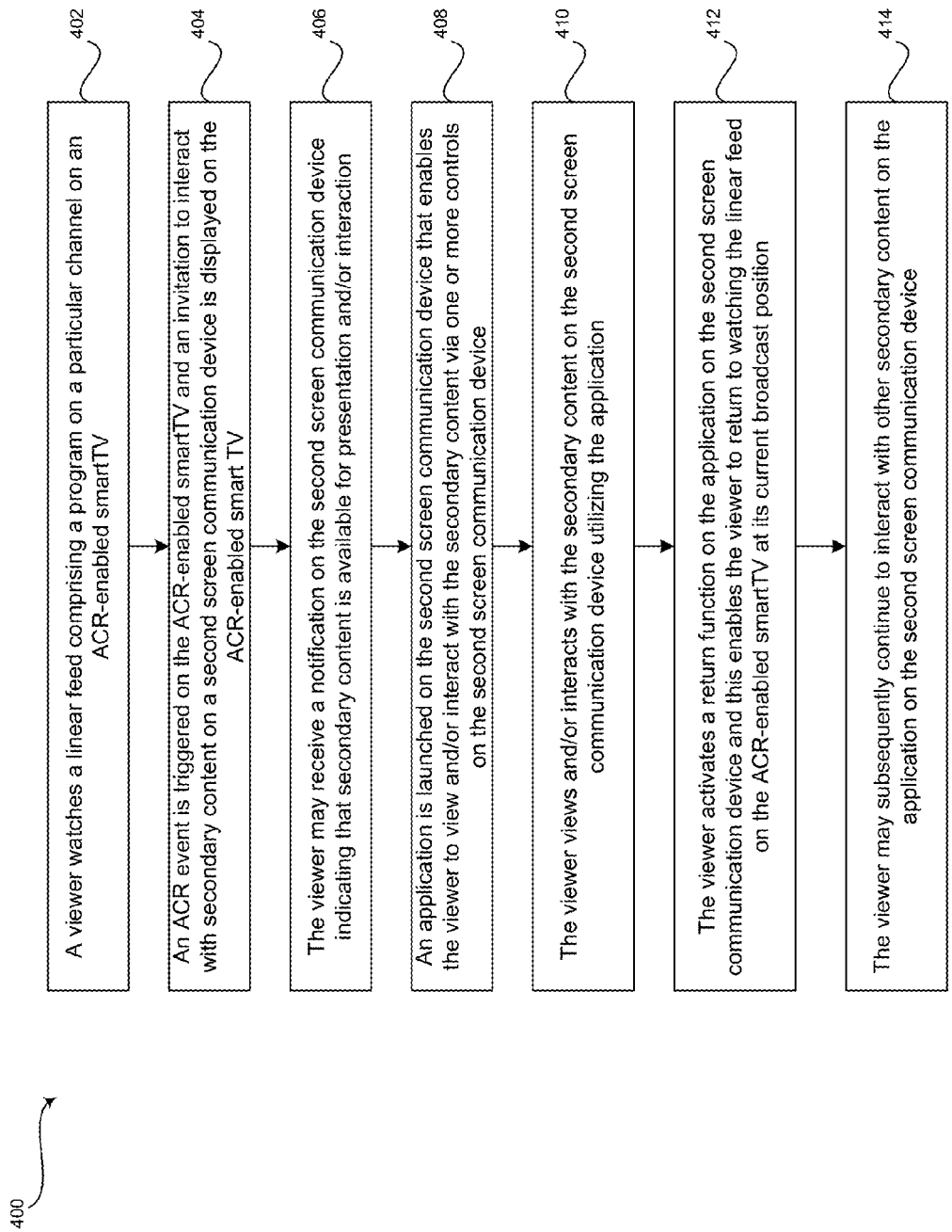
FIG. 4 is a flow chart that illustrates exemplary steps for viewer interaction in a system for automatic content recognition integration for smartTV and mobile communication devices, in accordance with an exemplary embodiment of the disclosure.

FIG. 4 is a flow chart that illustrates exemplary steps for viewer interaction in a system for automatic content recognition integration for smartTV and mobile communication devices, in accordance with an exemplary embodiment of the disclosure. Referring to FIG. 4, there is shown a flowchart 400 comprising a plurality of steps 402 through 414. In step 402, a viewer watches a linear feed comprising a program on a particular channel on an ACR-enabled smartTV. In step 404, an ACR event is triggered on the ACR-enabled smartTV and an invitation to interact with secondary content on a second screen communication device is displayed on the ACR-enabled smart TV. In step 406, the viewer may receive a notification on the second screen communication device indicating that secondary content is available for presentation and/or interaction. In step 408, an application is launched on the second screen communication device that enables the viewer to view and/or interact with the secondary content via one or more controls on the second screen communication device. In step 410, the viewer may view and/or interact with the secondary content on the second screen communication device utilizing the application. In step 412, the viewer activates a return function on the application on the second screen communication device and this enables the viewer to return to watching the linear feed on the ACR-enabled smartTV at its current broadcast position. The linear feed may be delivered to the ACR-enabled smartTV via the satellite network 208/MVPD infrastructure, which are illustrated in and described with respect to FIG. 3. In step 414, the viewer may subsequently continue to interact with other secondary content on the application on the second screen communication device.

Figure 5:
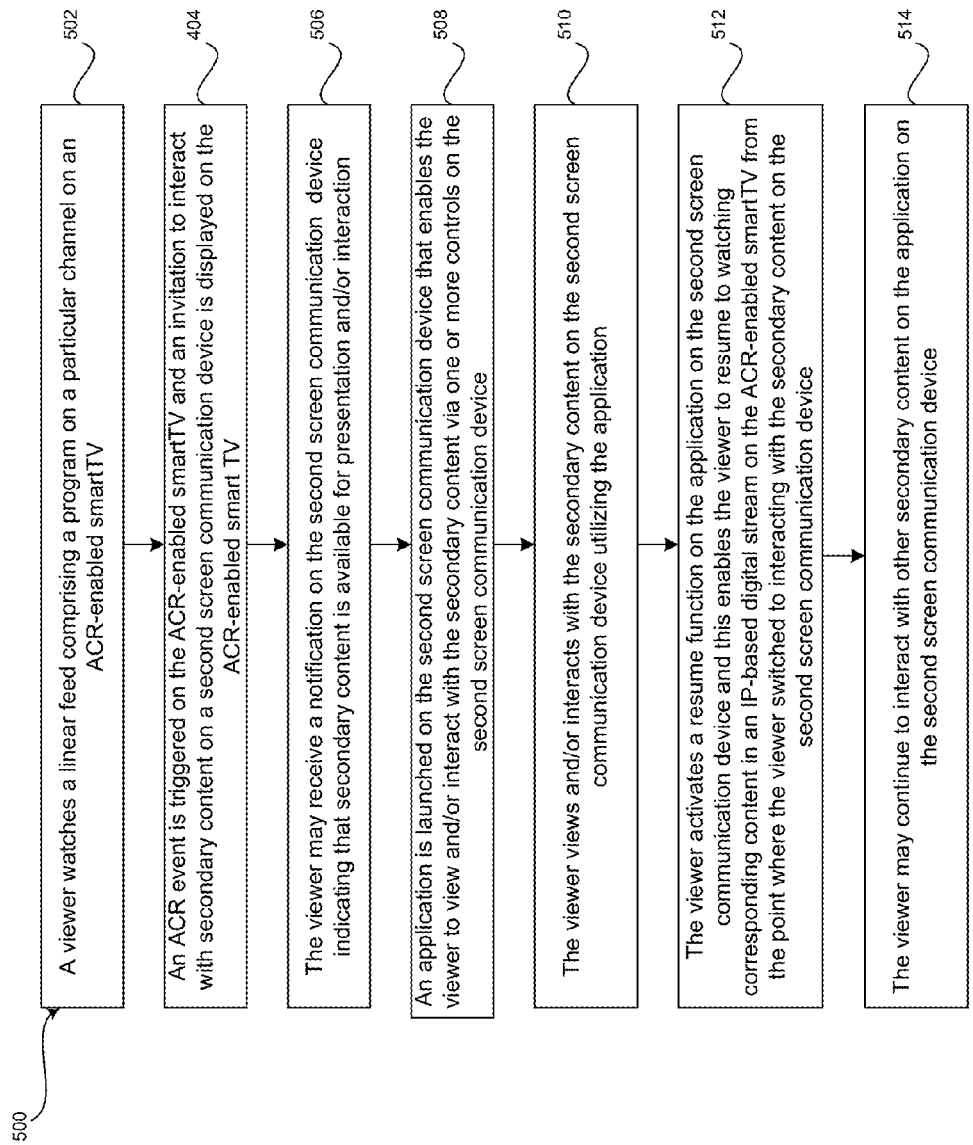
FIG. 5 is a flow chart that illustrates exemplary steps for viewer interaction in a system for automatic content recognition integration for smartTV and mobile communication devices, in accordance with an exemplary embodiment of the disclosure.

FIG. 5 is a flow chart that illustrates exemplary steps for viewer interaction in a system for automatic content recognition integration for smartTV and mobile communication devices, in accordance with an exemplary embodiment of the disclosure. Referring to FIG. 5, there is shown a flowchart 500 comprising a plurality of steps 502 through 514. In step 502, a viewer watches a linear feed comprising a program on a particular channel on an ACR-enabled smartTV. In step 504, an ACR event is triggered on the ACR-enabled smartTV and an invitation to interact with secondary content on a second screen communication device is displayed on the ACR-enabled smart TV. In step 506, the viewer may receive a notification on the second screen communication device indicating that secondary content is available for presentation and/or interaction. In step 508, an application is launched on the second screen communication device that enables the viewer to view and/or interact with the secondary content via one or more controls on the second screen communication device. In step 510, the viewer may view and/or interact with the secondary content on the second screen communication device utilizing the application. In step 512, the viewer activates a resume function on the application on the second screen communication device and this enables the viewer to resume watching corresponding content in an IP-based digital stream on the ACR-enabled smartTV from the point where the viewer switched to interacting with the secondary content via the second screen communication device. The IP-based digital stream may be delivered to the ACR-enabled smartTV via the content delivery network 110, which is illustrated in and described with respect to FIG. 1. In step 514, the viewer may subsequently continue to interact with other secondary content on the application on the second screen communication device.

Figure 6:
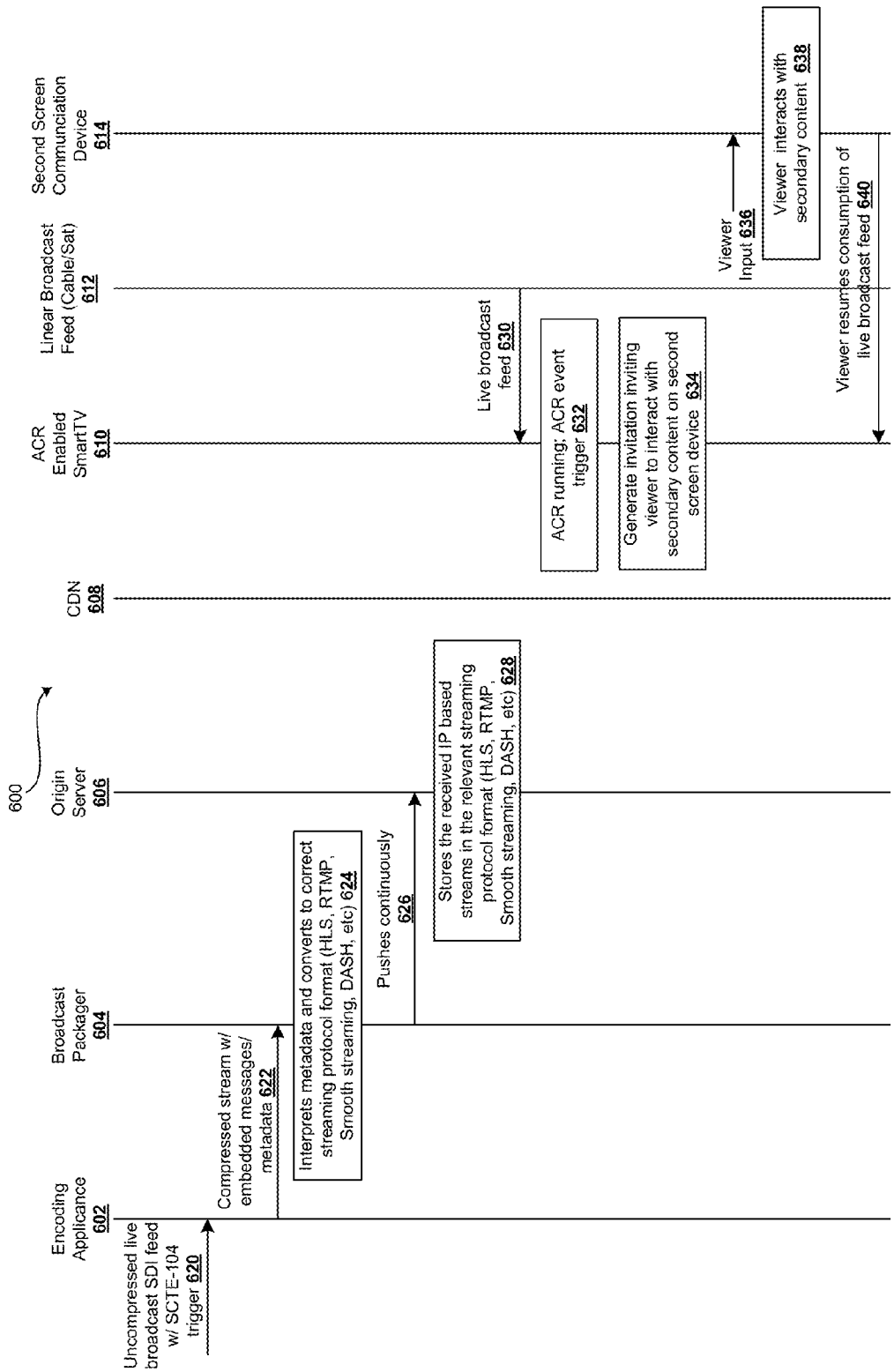
FIG. 6 is a flow diagram that illustrates exemplary steps for viewer interaction in a system for automatic content recognition integration for smartTV and mobile communication devices, in accordance with an exemplary embodiment of the disclosure.

FIG. 6 is a flow diagram that illustrates exemplary steps for viewer interaction in a system for automatic content recognition integration for smartTV and mobile communication devices, in accordance with an exemplary embodiment of the disclosure. Referring to FIG. 6, there is shown a flow diagram 600 comprising an encoding appliance 602, a broadcast packager 604, an origin server 606, a content delivery network 608, an ACR-enabled smartTV 610, a linear broadcast TV source 612, and a second screen communication device 614. FIG. 6 also illustrates a plurality of exemplary steps comprising steps 620 though 640.

In step 620, an uncompressed live broadcast SDI/HDSDI feed w/SCTE-104 trigger is received by the encoding appliance 602. In step 622, the encoding appliance 602 generates an output compressed stream with embedded messages and metadata. In step 624, the broadcast packager 604 interprets the metadata and converts the compressed stream with the embedded messages and metadata to the correct streaming protocol format, for example, HLS, RTMP, Smooth streaming, DASH, and so on. In step 626, the broadcast packager 604 continuously pushes the corresponding output stream to the origin server 606. In step 628, the origin server 606 stores the received IP based streams in the relevant streaming protocol format (HLS, RTMP, Smooth streaming, DASH, etc).

In step 630, a live broadcast feed, which comprises similar content as the uncompressed live broadcast SDI feed in step 620, may be received by the ACR-enabled smartTV 610 from the linear broadcast TV source 612. At 632, the ACR-enabled smartTV 610, which has ACR running, has an ACR triggered event and a notification is provided. The notification provides an indication that secondary content is available for consumption on the second screen communication device 614. In step 634, the ACR-enabled smartTV 610 may generate an invitation inviting the viewer to interact with secondary content on the second screen communication device 614. In step 636, the viewer may provide input to the second screen communication device 614 to acknowledge a corresponding notification on the second screen communication device 614. In step 638, the viewer may interact with the secondary content on the second screen communication device 614. The interactive application on the screen communication device 614 may enable the viewer to interact with the secondary content. In step 640, viewer may resume consumption of the live broadcast feed on the ACR-enabled smartTV 610.

In accordance with various embodiments of the disclosure, a second screen communication device such the second screen communication device 314 may be operable to launch an interactive application 314a in response to and/or based on an invitation cue or other type or notification presented by an ACR banner 152b displayed on an ACR-enabled display communication device or a notification displayed on the second screen communication device 314. The second screen communication device 314 may be paired with the ACR-enabled display communication device such as the ACR-enabled smartTV 312. The invitation cue may be generated and presented by the ACR-enabled display communication device (e.g. the ACR-enabled smartTV 312) while the ACR-enabled display communication device (e.g. the ACR-enabled smartTV 312) may be displaying the linear broadcast content. The linear broadcast content comprises live or DVR'd MVPD based broadcast content. The interactive application 314a, which may be launched on the second screen communication device 314, enables interaction with interactive content that is displayed by a user interface generated by the interactive application 314a on the second screen communication device 314 based on the invitation cue presented on the ACR-enabled display communication device (e.g. the ACR-enabled smartTV 312). The ACR-enabled display communication device may also be referred to as an ACR-enabled communication device. The ACR-enabled smartTV 312 is an example of an ACR-enabled display communication device.

One or more control elements that enable the interaction with the interactive content displayed by the user interface on the second screen communication device 314 may be generated by the second screen communication device (e.g. the ACR-enabled smartTV 312). The interaction with the interactive content may be controlled utilizing the generated one or more control elements. The generated one or more control elements may be utilized to resume display of an IP-based digital stream, which corresponds to the linear broadcast content, on the ACR-enabled enabled display communication device (e.g. the ACR-enabled smartTV 312). The second screen communication device 314 is operable to control the interaction with the interactive content utilizing the generated one or more control elements in order to cause the interactive content displayed by the user interface on the second screen communication device 314 to be concurrently displayed on the ACR-enabled display communication device (e.g. the ACR-enabled smartTV 312). The second screen communication device 314 may be operable to interact with additional interactive content, which may be displayed by the user interface on the second screen communication device 314 and is associated with the invitation cue, subsequent to resuming the displaying of the corresponding IP-based digital stream on the ACR-enabled display communication device 312.

The resumption of the IP version of the broadcast content at the desired point in time where interaction with secondary content on the automatic content recognition enabled display communication device was initiated may occur based on automatic content recognition detection parameters comprising, for example, content and timecode information. In this regard, an ACR enabled smartTV application may utilize content recognition detection parameters (e.g., content and timecode) available on the smartTV to delineate exactly where linear broadcast was replaced with the secondary. The broadcast IP stream is requested with the timecode and content information as obtained from the automatic content recognition service. The origin server 108 and/or content delivery network 110 may be operable to dynamically deliver content from the point in time requested, which is specified by the content recognition detection parameters.

The second screen communication device 314 is operable to receive a notification that indicates that the interactive content is available for display by the user interface on the second screen communication device 314. If the interactive application 314a is not installed on the second screen communication device 314 prior to the launching, the second screen communication device 314 may be operable to download and/or install the interactive application 314a on the second screen communication device 314. Once downloaded, the interactive application may be launched by the second screen communication device 314. Interaction with the interactive content utilizing the generated one or more control elements may be deferred utilizing the generated one or more control elements.

In accordance with an embodiment of the disclosure, the invitation cue may be generated based on an advertisement or other item within the linear broadcast content that is displayed by the ACR-enabled display communication device (e.g. the ACR-enabled smartTV 312). The interactive content displayed on the second screen communication device 314 may comprise subject matter that is representative of the advertisement. The invitation cue may comprise a visual and/or an audio cue. In an exemplary embodiment of the disclosure, the second screen communication device 314 may comprise a smart phone and a tablet and the ACR-enabled smartTV 312 may comprise an automatic content recognition enabled smart television.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the disclosure may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for automatic content recognition integration for smart televisions (smartTVs) and mobile communication devices.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   in a second screen communication device that is paired with an automatic content recognition enabled display communication device that communicates with an automatic content recognition system that assigns same interactive event identifiers to different sets of video fingerprints that are generated from same video content by different video fingerprint technologies from multiple vendors based on timing of assignment of the interactive event identifiers to multiple sequences of the video fingerprints that are generated from the same video content:
      in response to and/or based on an invitation cue generated by and presented on said automatic content recognition enabled display communication device, based on an automatic content recognition event triggered by an interactive event identifier, while said automatic content recognition enabled display communication device is displaying linear broadcast content, launching an interactive application on said second screen communication device, wherein said interactive application enables interaction with interactive content displayed by a user interface on said second screen communication device based on said invitation cue presented on said automatic content recognition enabled display communication device;
      generating one or more control elements that enables said interaction with said interactive content displayed by said user interface on said second screen communication device;
      controlling said interaction with said interactive content utilizing said generated one or more control elements; and
      resuming display of an IP-based digital stream content that corresponds to said linear broadcast content on said automatic content recognition enabled display communication device utilizing said generated one or more control elements, wherein said resumption is based on automatic content recognition parameters comprising time code and content information.

2. The method according to claim 1, wherein said controlling of said interaction with said interactive content utilizing said generated one or more control elements to cause said interactive content displayed by said user interface on said second screen communication device to be concurrently displayed on said automatic content recognition enabled display communication device.

3. The method according to claim 1, comprising interacting with additional interactive content, which is displayed by said user interface on said second screen communication device and is associated with said invitation cue, subsequent to said resuming of said display of said IP-based digital stream content on said automatic content recognition enabled display communication device.

4. The method according to claim 1, comprising receiving a notification on said second screen communication device that indicates that said interactive content is available for display by said user interface on said second screen communication device.

5. The method according to claim 1, comprising, if said interactive application is not installed on said second screen communication device prior to said launching, downloading and/or installing said interactive application on said second screen communication device.

6. The method according to claim 1, comprising deferring said interaction with said interactive content utilizing said generated one or more control elements.

7. The method according to claim 1, wherein said invitation cue is generated based on an advertisement, which comprises a portion of said linear broadcast content that is displayed by said automatic content recognition enabled display communication device.

8. The method according to claim 7, wherein said interactive content displayed on said second screen communication device comprises subject matter that is representative of said advertisement.

9. The method according to claim 1, wherein said invitation cue comprises a visual and/or an audio cue.

10. The method according to claim 1, wherein:
   said second screen communication device comprises one of a smart phone and a tablet; and
   said automatic content recognition enabled display communication device comprises an automatic content recognition enabled smart television.

11. A system, comprising:
a second screen communication device that is paired with an automatic content recognition enabled display communication device that communicates with an automatic content recognition system that assigns same interactive event identifiers to different sets of video fingerprints that are generated from same video content by different video fingerprint technologies from multiple vendors based on timing of assignment of the interactive event identifiers to multiple sequences of the video fingerprints that are generated from the same video content, said second screen communication device being operable to:
in response to and/or based on an invitation cue generated by and presented on said automatic content recognition enabled display communication device, based on an automatic content recognition event triggered by an interactive event identifier, while said automatic content recognition enabled display communication device is displaying linear broadcast content, launch an interactive application on said second screen communication device, wherein said interactive application enables interaction with interactive content displayed by a user interface on said second screen communication device based on said invitation cue presented on said automatic content recognition enabled display communication device;
generate one or more control elements that enables said interaction with said interactive content displayed by said user interface on said second screen communication device;
control said interaction with said interactive content utilizing said generated one or more control elements; and
resume display of said IP-based digital stream that corresponds to said linear broadcast content on said automatic content recognition enabled display communication device utilizing said generated one or more control elements, wherein said resumption is based on automatic content recognition parameters comprising time code and content information.

12. The system according to claim 11, wherein said second screen communication device is operable to control said interaction with said interactive content utilizing said generated one or more control elements to cause said interactive content displayed by said user interface on said second screen communication device to be concurrently displayed on said automatic content recognition enabled display communication device.

13. The system according to claim 11, wherein said second screen communication device is operable to interact with additional interactive content, which is displayed by said user interface on said second screen communication device and is associated with said invitation cue, subsequent to said resuming of said display of said IP-based digital stream content on said automatic content recognition enabled display communication device.

14. The system according to claim 11, wherein said second screen communication device is operable to receive a notification that indicates that said interactive content is available for display by said user interface on said second screen communication device.

15. The system according to claim 11, wherein said second screen communication device is operable to download and/or install said interactive application on said second screen communication device, if said interactive application is not installed on said second screen communication device prior to said launching.

16. The system according to claim 11, wherein said second screen communication device is operable to defer said interaction with said interactive content utilizing said generated one or more control elements.

17. The system according to claim 11, wherein said invitation cue is generated based on an advertisement, which comprises a portion of said linear broadcast content that is displayed by said automatic content recognition enabled display communication device.

18. The system according to claim 17, wherein said interactive content displayed on said second screen communication device comprises subject matter that is representative of said advertisement.

19. The system according to claim 11, wherein:
said second screen communication device comprises one of a smart phone and a tablet; and
said automatic content recognition enabled display communication device comprises an automatic content recognition enabled smart television.

20. The non-transitory computer-readable medium according to claim 11, wherein said invitation cue comprises a visual and/or an audio cue.

21. A non-transitory computer-readable medium having stored thereon, a computer program having at least one code section being executable by a machine for causing the machine to perform steps comprising:
in a second screen communication device that is paired with an automatic content recognition enabled display communication device that communicates with an automatic content recognition system that assigns same interactive event identifiers to different sets of video fingerprints that are generated from same video content by different video fingerprint technologies from multiple vendors based on timing of assignment of the interactive event identifiers to multiple sequences of the video fingerprints that are generated from the same video content:
in response to and/or based on an invitation cue generated by and presented on said automatic content recognition enabled display communication device, based on an automatic content recognition event triggered by an interactive event identifier, while said automatic content recognition enabled display communication device is displaying linear broadcast content, launching an interactive application on said second screen communication device, wherein said interactive application enables interaction with interactive content displayed by a user interface on said second screen communication device based on said invitation cue presented on said automatic content recognition enabled display communication device;
generating one or more control elements that enables said interaction with said interactive content displayed by said user interface on said second screen communication device;
controlling said interaction with said interactive content utilizing said generated one or more control elements; and
resuming display of said IP-based digital stream content that corresponds to said linear broadcast content on said automatic content recognition enabled display communication device utilizing said generated one or more control elements, wherein said resumption is based on automatic content recognition parameters comprising time code and content information.

22. The non-transitory computer-readable medium according to claim 21, wherein said controlling of said interaction with said interactive content utilizing said generated one or more control elements to cause said interactive content displayed by said user interface on said second screen communication device to be concurrently displayed on said automatic content recognition enabled display communication device.

23. The non-transitory computer-readable medium according to claim 21, comprising interacting with additional interactive content, which is displayed by said user interface on said second screen communication device and is associated with said invitation cue, subsequent to said resuming of said display of said IP-based digital stream content on said automatic content recognition enabled display communication device.

24. The non-transitory computer-readable medium according to claim 21, comprising receiving a notification on said second screen communication device that indicates that said interactive content is available for display by said user interface on said second screen communication device.

25. The non-transitory computer-readable medium according to claim 21, comprising, if said interactive application is not installed on said second screen communication device prior to said launching, downloading and/or installing said interactive application on said second screen communication device.

26. The non-transitory computer-readable medium according to claim 21, comprising deferring said interaction with said interactive content utilizing said generated one or more control elements.

27. The non-transitory computer-readable medium according to claim 21, wherein said invitation cue is generated based on an advertisement, which comprises a portion of said linear broadcast content that is displayed by said automatic content recognition enabled display communication device.

28. The non-transitory computer-readable medium according to claim 27, wherein said interactive content displayed on said second screen communication device comprises subject matter that is representative of said advertisement.

29. The non-transitory computer-readable medium according to claim 21, wherein said invitation cue comprises a visual and/or an audio cue.

30. The non-transitory computer-readable medium according to claim 21, wherein:
said second screen communication device comprises on of a smart phone and a tablet; and
said automatic content recognition enabled display communication device comprises an automatic content recognition enabled smart television.

31. A method, comprising:
in a second screen communication device that is paired with an automatic content recognition enabled display communication device that communicates with an automatic content recognition system that assigns same interactive event identifiers to different sets of video fingerprints that are generated from same video content by different video fingerprint technologies from multiple vendors based on timing of assignment of the interactive event identifiers to multiple sequences of the video fingerprints that are generated from the same video content, and the interactive event identifiers are utilized to trigger one or more interactive events:
in response to and/or based on an invitation cue generated by and presented on said automatic content recognition enabled display communication device, based on the triggered one or more interactive events, while said automatic content recognition enabled display communication device is displaying linear broadcast content, launching an interactive application on said second screen communication device, wherein said interactive application enables interaction with interactive content displayed by a user interface on said second screen communication device based on said invitation cue presented on said automatic content recognition enabled display communication device;
generating one or more control elements that enables said interaction with said interactive content displayed by said user interface on said second screen communication device;
controlling said interaction with said interactive content utilizing said generated one or more control elements; and
resuming display of an IP-based digital stream content that corresponds to said linear broadcast content on said automatic content recognition enabled display communication device utilizing said generated one or more control elements, wherein said resumption is based on automatic content recognition parameters comprising time code and content information.

* * * * *